(12) United States Patent
Harkrader

(10) Patent No.: US 8,955,265 B1
(45) Date of Patent: Feb. 17, 2015

(54) LOADING DOCK BARRIER ASSEMBLY

(76) Inventor: Nani J. Harkrader, Hagerstown, MD (US)

( * ) Notice: Subject to any disclaimer, the term of this patent is extended or adjusted under 35 U.S.C. 154(b) by 12 days.

(21) Appl. No.: 13/495,209

(22) Filed: Jun. 13, 2012

(51) Int. Cl.
*E04D 13/18* (2014.01)
*E04H 14/00* (2006.01)

(52) U.S. Cl.
USPC .......................................... 52/173.2; 52/2.12

(58) Field of Classification Search
USPC ............. 52/173.1, 173.2, 202, 2.12; 49/49, 9, 49/33, 360; 14/69.5; 404/6
See application file for complete search history.

(56) References Cited

U.S. PATENT DOCUMENTS

| | | | |
|---|---|---|---|
| 4,122,629 A | 10/1978 | Rennick | |
| 4,658,543 A * | 4/1987 | Carr | ................................ 49/139 |
| 5,157,801 A | 10/1992 | Alexander | |
| 5,299,386 A | 4/1994 | Naegelli et al. | |
| D347,096 S | 5/1994 | Burton | |
| 5,440,838 A * | 8/1995 | Lesser | .............................. 49/340 |
| 5,564,238 A | 10/1996 | Ellis | |
| 5,920,598 A | 7/1999 | Hyakudai et al. | |
| 7,380,375 B2 | 6/2008 | Maly | |
| 7,832,451 B2 | 11/2010 | Miller et al. | |
| 2005/0211389 A1 | 9/2005 | Snyder et al. | |
| 2006/0213626 A1 | 9/2006 | Snyder et al. | |
| 2006/0230681 A1 * | 10/2006 | Appelman | ......................... 49/49 |
| 2008/0127435 A1 * | 6/2008 | Maly et al. | ..................... 14/71.1 |

* cited by examiner

*Primary Examiner* — Brian Glessner
*Assistant Examiner* — Brian D Mattei

(57) ABSTRACT

A loading dock barrier assembly includes a loading dock having a front wall. Each of a pair of spaced side posts is positioned adjacent to the front wall. A top end of each side post extends above a top edge of the front wall. A barrier is coupled to and extends between the side posts. The barrier is slidable between a deployed position and a retracted position. The barrier blocks passage between the side posts when in the deployed position. The barrier is positioned to permit passage between the side posts when in the retracted position. An actuator moves the barrier. A trigger is coupled to the front wall of the loading dock between the side posts. The trigger is operationally coupled to the actuator and configured to activate the actuator when a truck is positioned in the loading dock adjacent to the front wall.

19 Claims, 5 Drawing Sheets

LOADING DOCK BARRIER ASSEMBLY

BACKGROUND OF THE DISCLOSURE

Field of the Disclosure

The disclosure relates to barrier devices and more particularly pertains to a new barrier device for providing an automated barrier blocking a loading dock when a transport vehicle is not in position for loading.

SUMMARY OF THE DISCLOSURE

An embodiment of the disclosure meets the needs presented above by generally comprising a loading dock having a front wall and a loading surface extending from a top edge of the front wall. Each of a pair of spaced side posts is positioned adjacent to the front wall of the loading dock. A top end of each side post extends above the top edge of the front wall of the loading dock. A barrier is coupled to and extends between the side posts. The barrier is slidable between a deployed position and a retracted position. The barrier is positioned above the top edge of the front wall of the loading dock blocking passage between the side posts when in the deployed position. The barrier is positioned to permit passage between the side posts when in the retracted position. An actuator operationally coupled to the barrier to move the barrier between the deployed position and the retracted position. A trigger is coupled to the front wall of the loading dock and positioned between the side posts. The trigger is operationally coupled to the actuator and configured to activate the actuator when a truck is positioned in the loading dock adjacent to the front wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
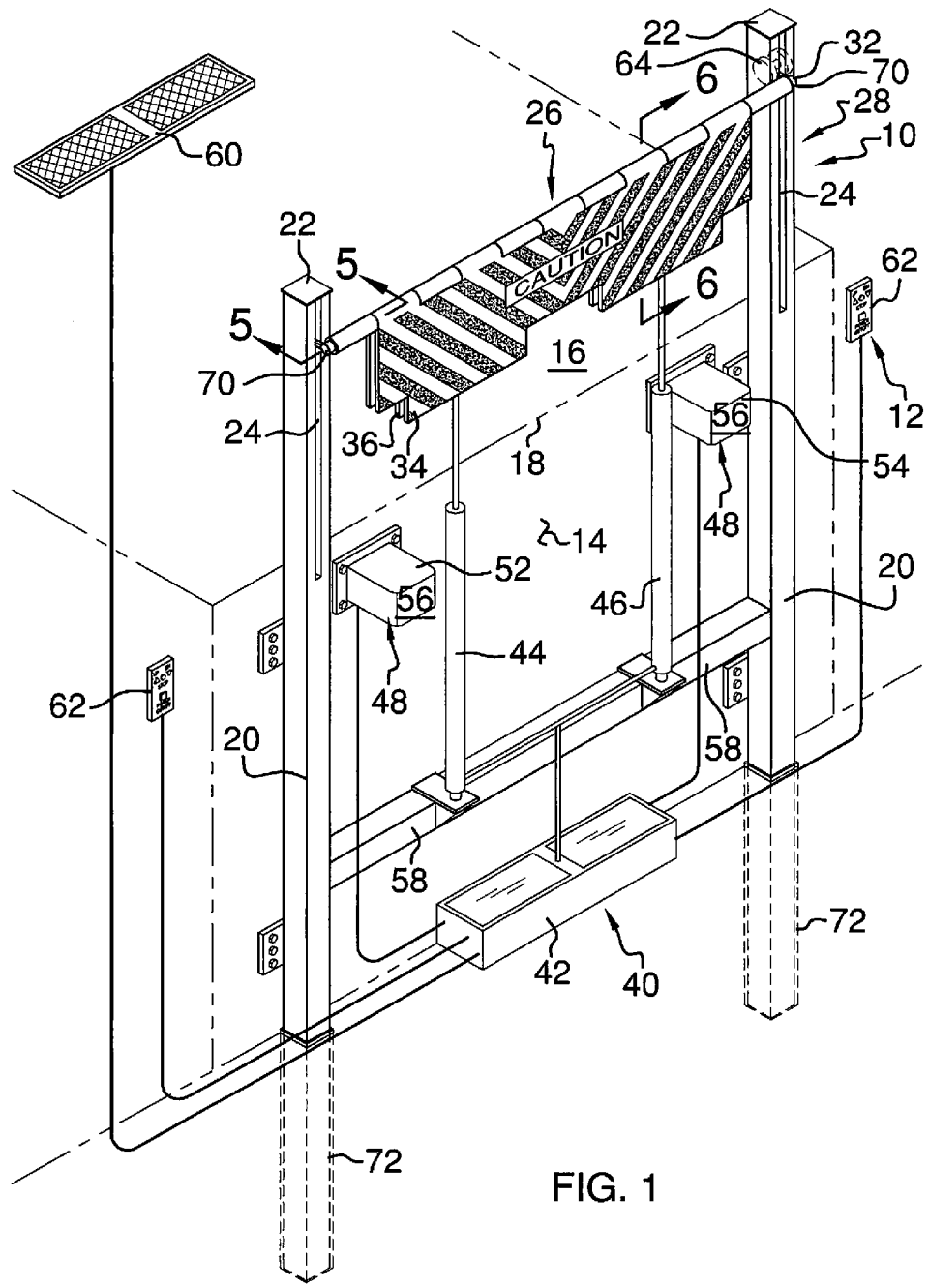
FIG. 1 is a top front side perspective view of a loading dock barrier assembly according to an embodiment of the disclosure.
Figure 2:
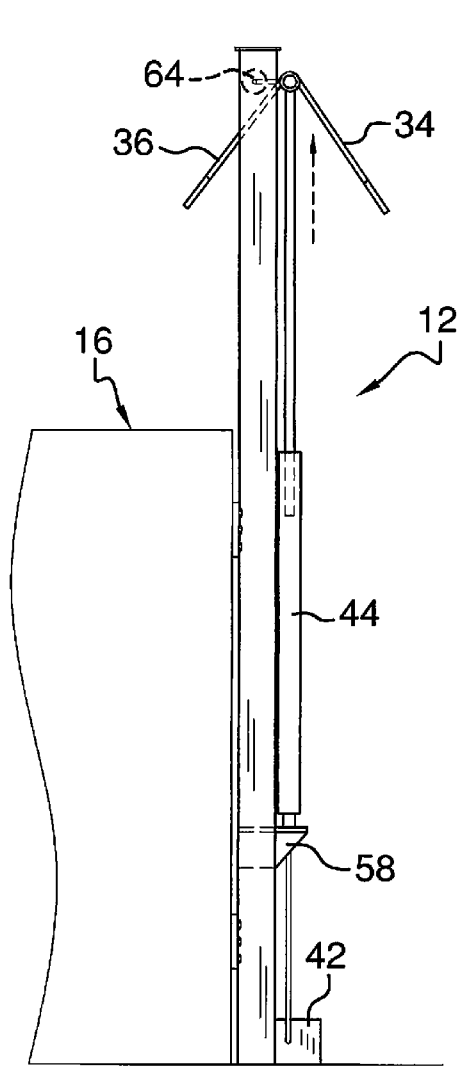
FIG. 2 is a side view of an embodiment of the disclosure.
Figure 3:
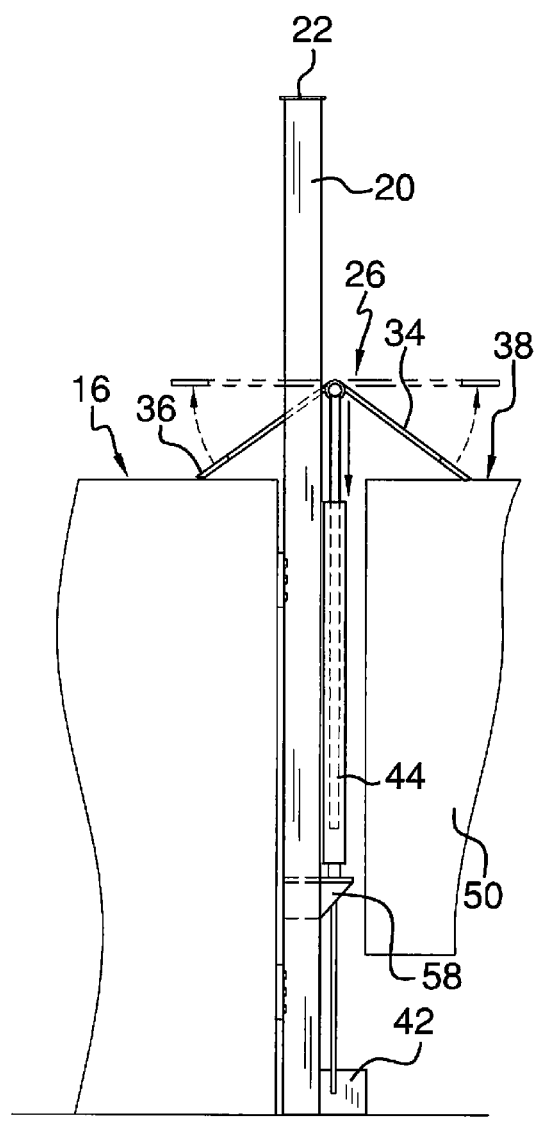
FIG. 3 is a side view of an embodiment of the disclosure.
Figure 4:
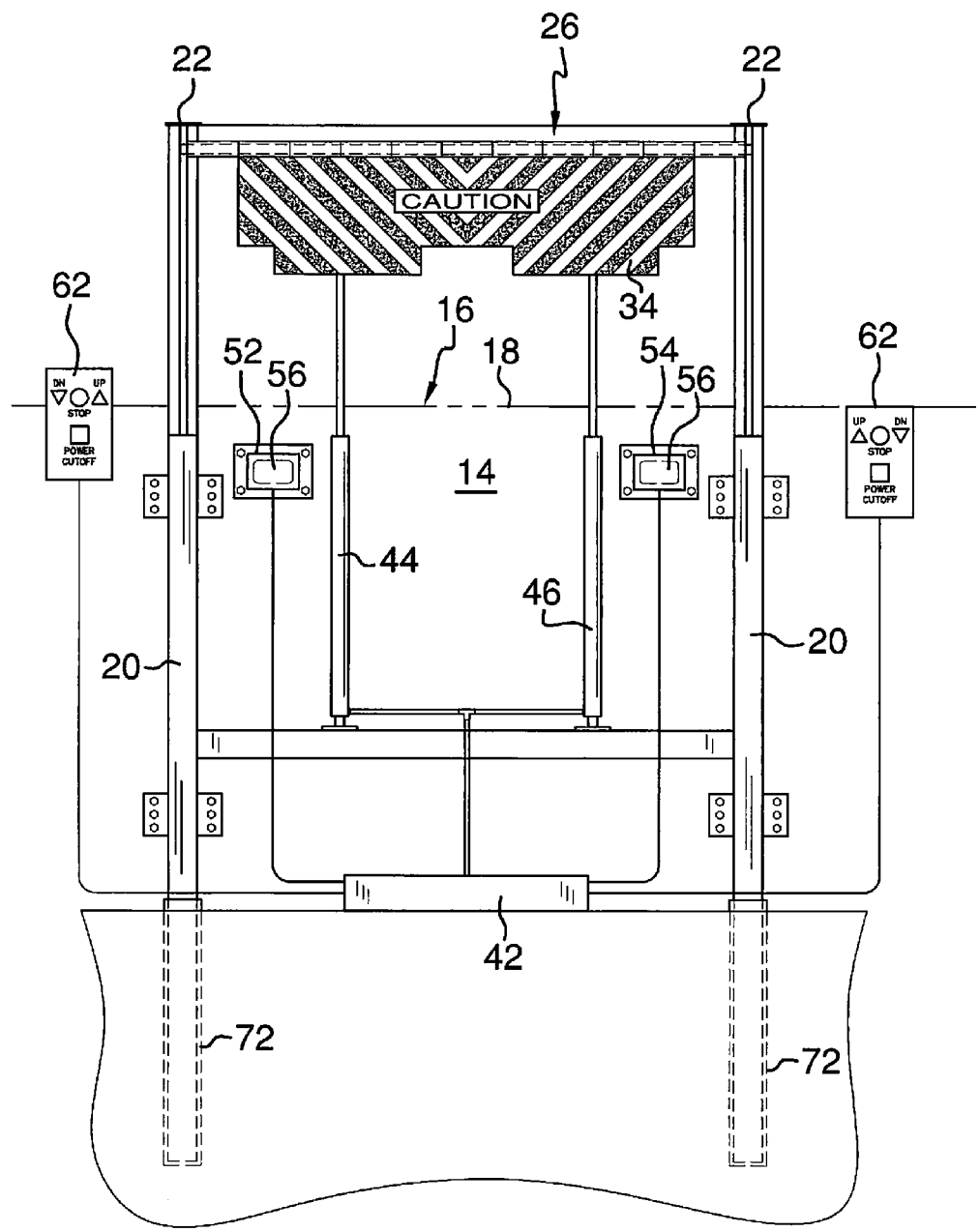
FIG. 4 is a front view of an embodiment of the disclosure.
Figure 5:
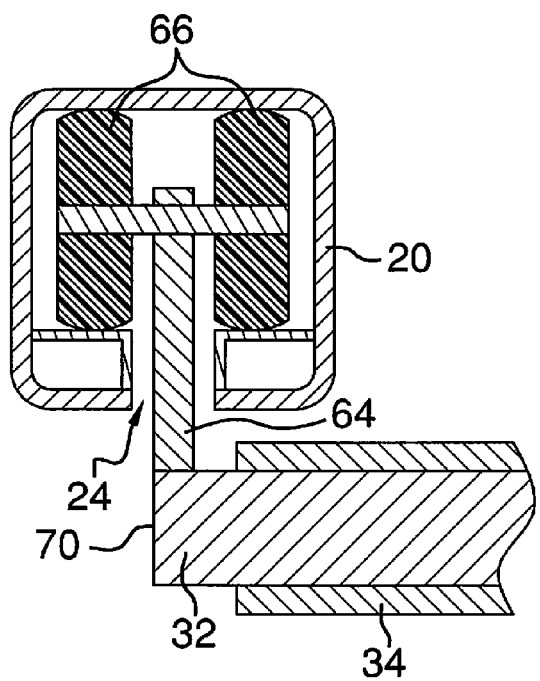
FIG. 5 is a cross-sectional view of an embodiment of the disclosure taken along line 5-5 of FIG. 1.
Figure 6:
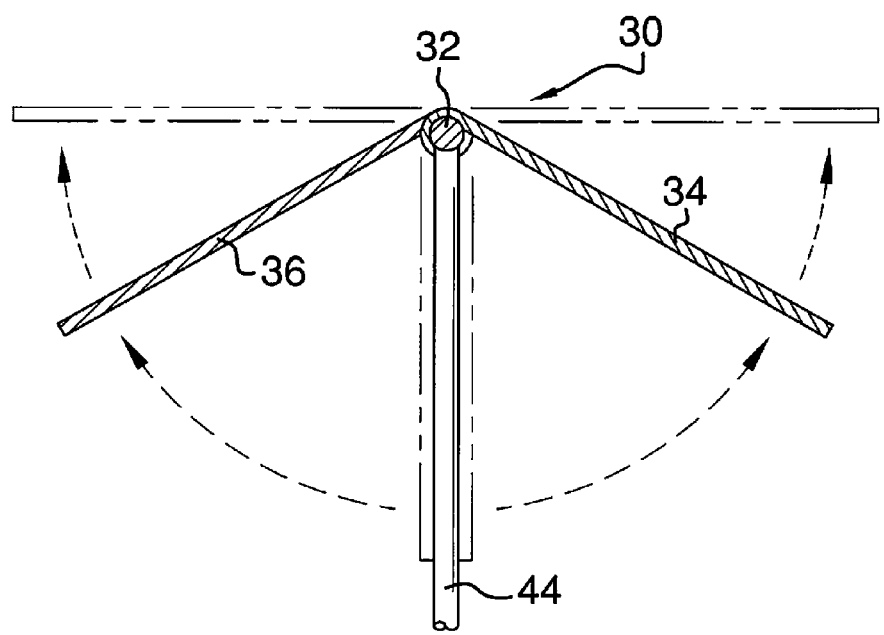
FIG. 6 is a cross-sectional view of an embodiment of the disclosure taken along line 6-6 of FIG. 1.
Figure 7:
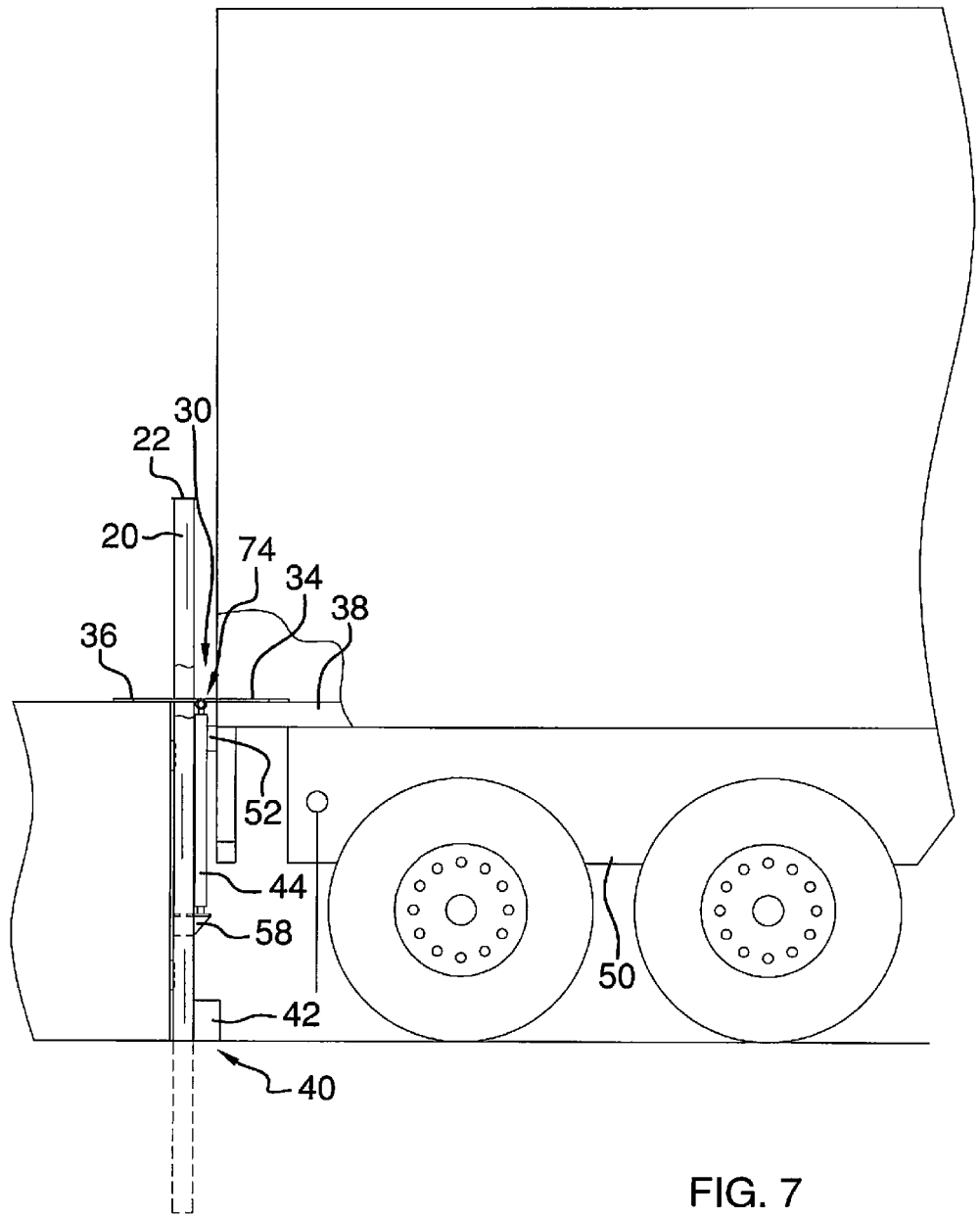
FIG. 7 is a side view of an embodiment of the disclosure in use.

With reference now to the drawings, and in particular to FIGS. 1 through 7 thereof, a new barrier device embodying the principles and concepts of an embodiment of the disclosure and generally designated by the reference numeral 10 will be described.

As best illustrated in FIGS. 1 through 7, the loading dock barrier assembly 10 generally comprises a loading dock 12 having a front wall 14 and a loading surface 16 extending from a top edge 18 of the front wall 14. A pair of spaced side posts 20 is positioned adjacent to the front wall 14 of the loading dock 12. A top end 22 of each side post 20 extends above the top edge 18 of the front wall 14 of the loading dock 12. Each side post 20 may have a slot 24 extending downwardly from the top end 22 of the side post 20. A barrier 26 is coupled to and extends between the side posts 20. The barrier 26 is slidable between a deployed position 28 and a retracted position 30. The barrier 26 is positioned above the top edge 18 of the front wall 14 of the loading dock 12 blocking passage between the side posts 20 when in the deployed position 28. The barrier 26 is positioned to permit passage between the side posts 20 when in the retracted position 30. The barrier 26 may have a cross bar 32 coupled to and extending between the side posts 20. The barrier 26 has a pair of panels 34,36 pivotally coupled to the cross bar 32. The pair of panels 34,36 includes a front panel 34 and a back panel 36. The front panel 34 is configured for pivoting forwardly to rest upon a truck surface 38 when the barrier 26 is in the retracted position 30. The back panel 36 pivots simultaneously to rest upon the loading surface 16 when the barrier 26 is in the retracted position 30. The front panel 34 and the back panel 36 are substantially coplanar when the barrier 26 is in the retracted position 30.

An actuator 40 is operationally coupled to the barrier 26 to move the barrier 26 between the deployed position 28 and the retracted position 30. The actuator 40 includes a hydraulic pump 42 operationally coupled to a first piston 44. The first piston 44 is operationally coupled to the barrier 26 for elevating the barrier 26 into the deployed position 28. The actuator 40 may have a second piston 46 operationally coupled to the hydraulic pump 42. The second piston 46 is positioned in spaced relationship to the first piston 44.

A trigger 48 is coupled to the front wall 14 of the loading dock 12. The trigger 48 is positioned between the side posts 20 and operationally coupled to the actuator 40. The trigger 48 is configured to activate the actuator 40 when a truck 50 is positioned in the loading dock 12 adjacent to the front wall 14. The trigger 48 has a first pressure switch 52 coupled to and extending from the front wall 14 of the loading dock 12. The trigger 48 may also have a second pressure switch 54 coupled to and extending from the front wall 14 of the loading dock 12 positioned in spaced relationship to the first pressure switch 52. Each pressure switch 52,54 has a front face 56 positioned offset from the front wall 14 of the loading dock sufficiently distant such that the truck 50 contacts the front face 56 as the truck 50 reaches a desired loading and unloading position for the loading dock 12.

A pair of support beams 58 may be provided. Each support beam 58 is coupled to and extends inwardly from an associated one of the side posts 20. Each support beam 58 is positioned below the top edge 18 of the front wall 14 of the loading dock 12. The first piston 44 and second piston 46 are each coupled to and extend upwardly from an associated one of the support beams 20.

A solar panel 60 may be operationally coupled to the hydraulic pump 42 and positioned remotely from the loading dock 12 in a position to receive sufficient light to provide power to the hydraulic pump 42. A manual switch 62 may be operationally coupled to the actuator 40 for selectively moving the barrier 26 by manipulation of the manual switch 62 when desired without having to position the truck 50 in the loading dock 12.

A pair of end rollers 64 each have a pair of wheels 66 and a shaft 68. The shaft 68 is coupled to and extends between the pair of wheels 66 and an associated end 70 of the cross bar 32. The pair of wheels 66 of each end roller 64 is positioned in an associated one of the side posts 20 and the shaft 68 extends through the slot 24 of the associated side post 20.

A pair of footings 72 may be utilized. Each footing 72 is positioned adjacent to the front wall 14 of the loading dock 12. Each side post 20 is coupled to and extends upwardly from an associated one of the footings 72.

In use, the assembly 10 is automated to elevate and lower the barrier 26 to prevent accidental passage through the side posts 20 when the truck 50 is not present in the loading dock 12. The front panel 34 and back panel 36 further pivot in the retracted position 30 to provide a bridge over a gap 74 between the truck 50 and the loading surface 16 of the loading dock 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A loading dock barrier assembly comprising:
    a loading dock having a front wall and a loading surface extending from a top edge of said front wall;
    a pair of spaced side posts, each said side post being positioned adjacent to said front wall of said loading dock, a top end of each said side post extending above said top edge of said front wall of said loading dock;
    a barrier coupled to and extending between said side posts, said barrier being slidable between a deployed position and a retracted position, said barrier being positioned above said top edge of said front wall of said loading dock blocking passage between said side posts when in said deployed position, said barrier being positioned to permit passage between said side posts when in said retracted position;
    an actuator operationally coupled to said barrier to move said barrier between said deployed position and said retracted position;
    a trigger coupled to said front wall of said loading dock, said trigger being positioned between said side posts, said trigger being operationally coupled to said actuator, said trigger being configured to activate said actuator when a truck is positioned in said loading dock adjacent to said front wall;
    said actuator having a hydraulic pump operationally coupled to a first piston, said first piston being operationally coupled to said barrier for elevating said barrier into said deployed position;
    said actuator having a second piston operationally coupled to said hydraulic pump, said second piston being positioned in spaced relationship to said first piston; and
    a pair of support beams, each said support beam being coupled to and extending inwardly from an associated one of said side posts, each said support beam being positioned below said top edge of said front wall of said loading dock, said first and second pistons each being coupled to and extending upwardly from an associated one of said support beams.

2. The assembly of claim 1, further including said trigger having a first pressure switch coupled to and extending from said front wall of said loading dock.

3. The assembly of claim 1, further including said trigger having a second pressure switch coupled to and extending from said front wall of said loading dock.

4. The assembly of claim 1, further including a solar panel operationally coupled to said hydraulic pump.

5. The assembly of claim 1, further including a manual switch operationally coupled to said actuator for selectively moving said barrier by manipulation of said manual switch.

6. The assembly of claim 1, further comprising:
    said barrier having a cross bar coupled to and extending between said side posts; and
    a pair of panels pivotally coupled to said cross bar, said pair of panels being a front panel and a back panel, said front panel being configured for pivoting forwardly to rest upon a truck surface when said barrier is in said retracted position, said back panel pivoting to rest upon said loading surface when said barrier is in said retracted position.

7. The assembly of claim 6, further including said front panel and said back panel being coplanar when said barrier is in said retracted position.

8. The assembly of claim 6, further comprising:
    each side post having a slot extending downwardly from said top end of said side post;
    a pair of end rollers, each end roller having a pair of wheels and a shaft, said shaft being coupled to and extending between said pair of wheels and an associated end of said cross bar, said pair of wheels of each end roller being positioned in an associated one of said side posts and said shaft extending through said slot of said associated side post.

9. The assembly of claim 1, further including a pair of footings, each footing being positioned adjacent to said front wall of said loading dock, each said side post being coupled to and extending upwardly from an associated one of said footings.

10. A loading dock barrier assembly comprising:
    a loading dock having a front wall and a loading surface extending from a top edge of said front wall;
    a pair of spaced side posts, each said side post being positioned adjacent to said front wall of said loading dock, a top end of each said side post extending above said top edge of said front wall of said loading dock, each side post having a slot extending downwardly from said top end of said side post;
    a barrier coupled to and extending between said side posts, said barrier being slidable between a deployed position and a retracted position, said barrier being positioned above said top edge of said front wall of said loading dock blocking passage between said side posts when in said deployed position, said barrier being positioned to permit passage between said side posts when in said retracted position, said barrier having a cross bar coupled to and extending between said side posts, said barrier having a pair of panels pivotally coupled to said cross bar, said pair of panels being a front panel and a back panel, said front panel being configured for pivoting forwardly to rest upon a truck surface when said barrier is in said retracted position, said back panel pivoting to rest upon said loading surface when said barrier is in said retracted position, said front panel and said back panel being coplanar when said barrier is in said retracted position;

an actuator operationally coupled to said barrier to move said barrier between said deployed position and said retracted position, said actuator having a hydraulic pump operationally coupled to a first piston, said first piston being operationally coupled to said barrier for elevating said barrier into said deployed position, said actuator having a second piston operationally coupled to said hydraulic pump, said second piston being positioned in spaced relationship to said first piston;

a trigger coupled to said front wall of said loading dock, said trigger being positioned between said side posts, said trigger being operationally coupled to said actuator, said trigger being configured to activate said actuator when a truck is positioned in said loading dock adjacent to said front wall, said trigger having a first pressure switch coupled to and extending from said front wall of said loading dock, said trigger having a second pressure switch coupled to and extending from said front wall of said loading dock;

a pair of support beams, each said support beam being coupled to and extending inwardly from an associated one of said side posts, each said support beam being positioned below said top edge of said front wall of said loading dock, said first and second pistons each being coupled to and extending upwardly from an associated one of said support beams;

a solar panel operationally coupled to said hydraulic pump;

a manual switch operationally coupled to said actuator for selectively moving said barrier by manipulation of said manual switch;

a pair of end rollers, each end roller having a pair of wheels and a shaft, said shaft being coupled to and extending between said pair of wheels and an associated end of said cross bar, said pair of wheels of each end roller being positioned in an associated one of said side posts and said shaft extending through said slot of said associated side post; and a pair of footings, each footing being positioned adjacent to said front wall of said loading dock, each said side post being coupled to and extending upwardly from an associated one of said footings.

11. A loading dock barrier assembly comprising:

a loading dock having a front wall and a loading surface extending from a top edge of said front wall;

a pair of spaced side posts, each said side post being positioned adjacent to said front wall of said loading dock, a top end of each said side post extending above said top edge of said front wall of said loading dock;

a barrier coupled to and extending between said side posts, said barrier being slidable between a deployed position and a retracted position, said barrier being positioned above said top edge of said front wall of said loading dock blocking passage between said side posts when in said deployed position, said barrier being positioned to permit passage between said side posts when in said retracted position;

an actuator operationally coupled to said barrier to move said barrier between said deployed position and said retracted position;

a trigger coupled to said front wall of said loading dock, said trigger being positioned between said side posts, said trigger being operationally coupled to said actuator, said trigger being configured to activate said actuator when a truck is positioned in said loading dock adjacent to said front wall;

said barrier having a cross bar coupled to and extending between said side posts; and a pair of panels pivotally coupled to said cross bar, said pair of panels being a front panel and a back panel, said front panel being configured for pivoting forwardly to rest upon a truck surface when said barrier is in said retracted position, said back panel pivoting to rest upon said loading surface when said barrier is in said retracted position.

12. The assembly of claim 11, further including said actuator having a hydraulic pump operationally coupled to a first piston, said first piston being operationally coupled to said barrier for elevating said barrier into said deployed position, said actuator having a second piston operationally coupled to said hydraulic pump, said second piston being positioned in spaced relationship to said first piston.

13. The assembly of claim 12, further including a pair of support beams, each said support beam being coupled to and extending inwardly from an associated one of said side posts, each said support beam being positioned below said top edge of said front wall of said loading dock, said first and second pistons each being coupled to and extending upwardly from an associated one of said support beams.

14. The assembly of claim 12, further including a solar panel operationally coupled to said hydraulic pump.

15. The assembly of claim 11, further including said trigger having a first pressure switch coupled to and extending from said front wall of said loading dock.

16. The assembly of claim 15, further including said trigger having a second pressure switch coupled to and extending from said front wall of said loading dock.

17. The assembly of claim 11, further including said front panel and said back panel being coplanar when said barrier is in said retracted position.

18. The assembly of claim 11, further comprising:

each side post having a slot extending downwardly from said top end of said side post;

a pair of end rollers, each end roller having a pair of wheels and a shaft, said shaft being coupled to and extending between said pair of wheels and an associated end of said cross bar, said pair of wheels of each end roller being positioned in an associated one of said side posts and said shaft extending through said slot of said associated side post.

19. The assembly of claim 11, further including a pair of footings, each footing being positioned adjacent to said front wall of said loading dock, each said side post being coupled to and extending upwardly from an associated one of said footings.

* * * * *